US012744763B2

(12) United States Patent
Aitken et al.

(10) Patent No.: US 12,744,763 B2
(45) Date of Patent: Sep. 22, 2026

(54) CENTRALLY MANAGED REMOTE STORAGE ENCRYPTION AND DECRYPTION

(71) Applicant: Lucasfilm Entertainment Company Ltd. LLC, San Francisco, CA (US)

(72) Inventors: Francis Aitken, Nicasio, CA (US); Stephen Morris, San Francisco, CA (US); Ryan Justin Frias, Vacaville, CA (US); Scott Levine, San Anselmo, CA (US)

(73) Assignee: Lucasfilm Entertainment Company Ltd. LLC

( * ) Notice: Subject to any disclaimer, the term of this patent is extended or adjusted under 35 U.S.C. 154(b) by 207 days.

(21) Appl. No.: 18/173,697

(22) Filed: Feb. 23, 2023

(65) Prior Publication Data

US 2024/0291808 A1 Aug. 29, 2024

(51) Int. Cl.
*H04L 9/40* (2022.01)
*H04L 67/1097* (2022.01)

(52) U.S. Cl.
CPC ...... *H04L 63/0435* (2013.01); *H04L 63/0272* (2013.01); *H04L 67/1097* (2013.01)

(58) Field of Classification Search
CPC ............. H04L 63/0434; H04L 63/0272; H04L 67/1097
See application file for complete search history.

(56) References Cited

U.S. PATENT DOCUMENTS 10,311,240 B1 * 6/2019 Nissler ................ H04L 63/0428
10,581,617 B2 * 3/2020 Khosravi ............ G06F 21/6209
11,127,491 B2 * 9/2021 Austin ................... G16H 10/60
11,256,816 B2 * 2/2022 Yankovskiy ............ H04L 9/083
11,438,357 B2 * 9/2022 Mistry ................ H04L 63/1466
11,444,754 B1 * 9/2022 Shaked ................. H04L 9/0894
11,582,221 B1 * 2/2023 Raj ......................... H04L 63/06
11,646,878 B2 * 5/2023 Sofia ..................... H04L 9/0825 380/44
11,716,391 B2 * 8/2023 Azulay ................ H04L 9/0891 709/227
12,120,097 B2 * 10/2024 Schmatz ............... H04L 9/0822
12,255,980 B2 * 3/2025 Bitar ....................... H04L 9/008
(Continued)

*Primary Examiner* — Viral S Lakhia
(74) *Attorney, Agent, or Firm* — Squire Patton Boggs LLP; Sarah Mirza

(57) ABSTRACT

Techniques are disclosed for centrally managing remote storage encryption and decryption. In some embodiments, to access an encrypted volume on a storage device connected to a computing device, a virtual private network (VPN) client authenticates a user of the computing device to a VPN. After authenticating the user and establishing a VPN connection, the VPN client launches a key management system (KMS) client that authenticates the user and requests an encryption key from a KMS server based on the user, a volume identifier (ID) of the encrypted volume, and a storage device ID of the storage device. The KMS server verifies that the user is allowed to access the encrypted volume having the volume ID, and that the encrypted volume is stored on the storage device having the storage device ID. Upon verification, the KMS server transmits the encryption key to the KMS client for decrypting the encrypted volume.

20 Claims, 6 Drawing Sheets

(56) References Cited

U.S. PATENT DOCUMENTS

| | | | | |
|---|---|---|---|---|
| 2015/0373030 | A1* | 12/2015 | Bank | H04W 4/025 455/411 |
| 2021/0014048 | A1* | 1/2021 | Lee | H04L 9/0825 |
| 2021/0103392 | A1* | 4/2021 | Murray | G06F 3/0689 |
| 2022/0093275 | A1* | 3/2022 | Sternberg | G16H 50/20 |
| 2022/0382898 | A1* | 12/2022 | Thomsen | G06F 21/64 |
| 2022/0391107 | A1* | 12/2022 | Mallick | G06F 3/067 |
| 2023/0144072 | A1* | 5/2023 | Shemer | H04L 9/0822 713/193 |
| 2023/0336343 | A1* | 10/2023 | Lee | H04L 9/088 |
| 2024/0171389 | A1* | 5/2024 | Lee | H04L 9/0822 |
| 2024/0205003 | A1* | 6/2024 | Bok | H04L 9/3073 |

* cited by examiner

CENTRALLY MANAGED REMOTE STORAGE ENCRYPTION AND DECRYPTION

Embodiments of the present disclosure relate generally to computer storage and encryption and, more specifically, to centrally managed remote storage encryption and decryption.

DESCRIPTION OF THE RELATED ART

Users are increasingly working from remote computing devices that are located outside the traditional premises of firms. Oftentimes, high performance access to the same data that is available at the traditional premises is required to retain efficiency when working from a remote computing device.

One conventional approach for providing high performance and secure access to data is to store the data within an encrypted volume on a storage device. The storage device is given to a user, who can connect the storage device to a remote computing device and decrypt the encrypted volume using an encryption key or associated password. Once decrypted, data on the decrypted volume can be accessed and modified by the user.

One drawback of the above approach to providing high performance and secure access to data is anyone having knowledge of the encryption key or associated password can decrypt the encrypted volume and access data stored therein, which presents a security risk. Another drawback of the above approach is that access to data stored within the encrypted volume cannot be easily revoked when a user having knowledge of the encryption key or associated password should no longer be allowed to access such data.

As the foregoing illustrates, what is needed in the art are more effective techniques for remote storage encryption and decryption.

SUMMARY

One embodiment of the present application sets forth a computer-implemented method for decrypting an encrypted volume. The method includes identifying an encrypted volume stored on a storage device. The method further includes requesting, from a server, an encryption key based on a user, an identifier (ID) associated with the encrypted volume, and an ID associated with the storage device. In addition, the method includes decrypting the encrypted volume based on the encryption key.

Other embodiments of the present disclosure include, without limitation, one or more computer-readable media including instructions for performing one or more aspects of the disclosed techniques as well as a computing device for performing one or more aspects of the disclosed techniques.

At least one technical advantage of the disclosed techniques relative to the prior art is that, with the disclosed techniques, the storage and use of encryption keys is transparent to users, who are not required to know the encryption keys or associated passwords in order to decrypt encrypted volumes. Further, access to the decrypted volumes is automatically revoked when users are invalidated or no longer assigned to data set management groups associated with the decrypted volumes. In addition, encrypted volumes are mounted and decrypted only after associated users are authenticated to a secure network environment. These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
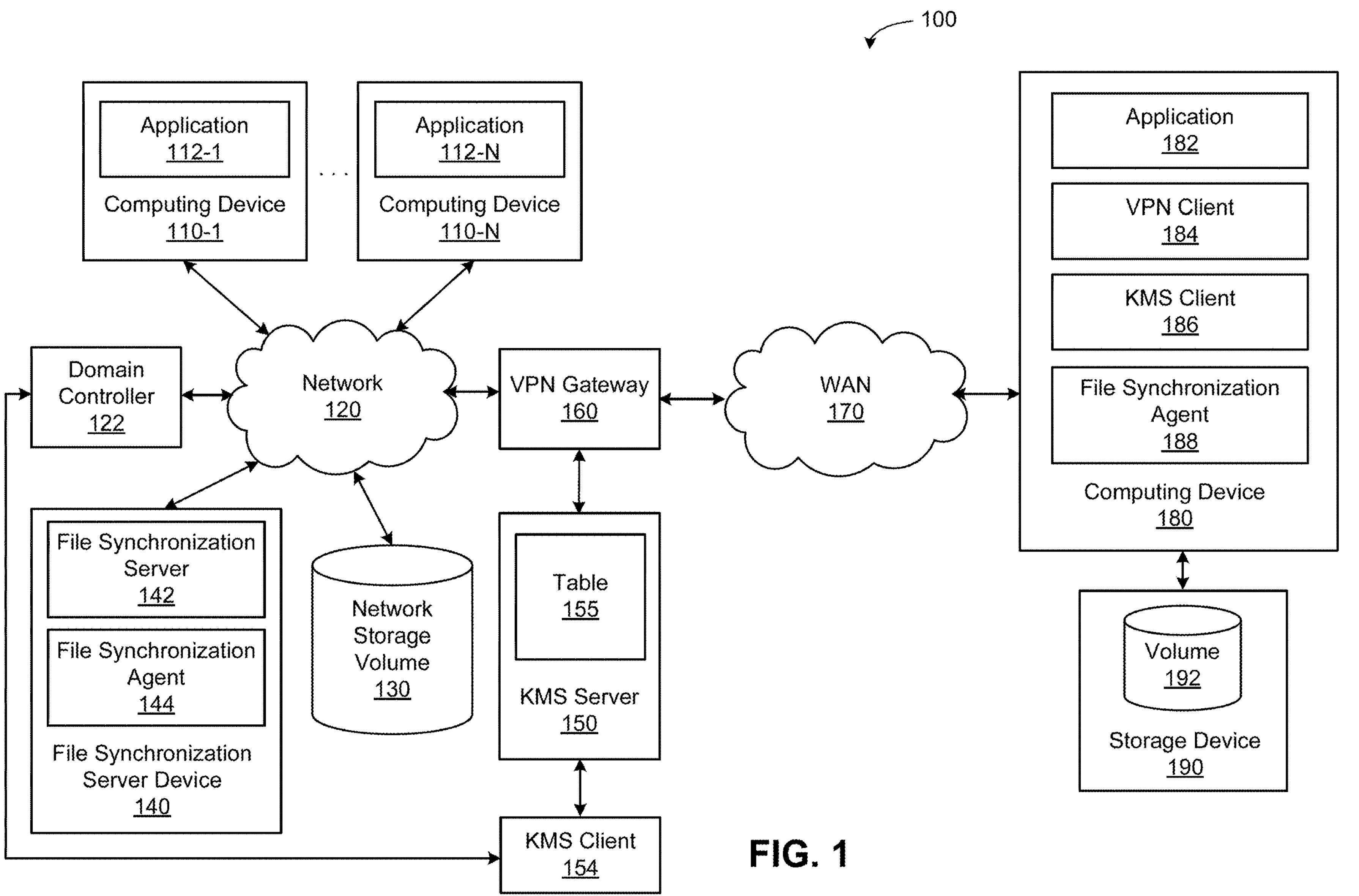
FIG. 1 illustrates a system for centrally managed remote storage encryption and decryption, according to various embodiments.

FIG. 1 illustrates a system 100 for centrally managed remote storage encryption and decryption, according to various embodiments. As shown, the system 100 includes an on-premises network 120 at the premises of an entity, such as the facility of a firm. A number of computing devices 110-1 to 110-N (referred to herein collectively as computing devices 110 and individually as a computing device 110), a domain controller 122, a network storage volume 130, a file synchronization server device 140, and a virtual private network (VPN) gateway 160 are connected to the on-premises network 120. The system 100 further includes a key management system (KMS) server 150 that is in communication with the VPN gateway 160 and a KMS client 154. In addition, the system 100 includes a computing device 180 that is remote from the premises of the entity and a storage device 190, such as an external hard drive (HD), that can be attached to the computing device 180. The computing device 180 can connect to the on-premises network 120 via a VPN that extends the on-premises network 120 across a wide area network (WAN) 170, such as the Internet.

The network storage volume 130 is configured to store a data set. For example, the data set could include a set of files associated with a project. In some embodiments, the network storage volume 130 is a centralized storage provided by a network-attached storage (NAS) device or a storage area network (SAN). Users of the computing devices 110 can be assigned to a data set management group that permits those users to access and modify the data set stored in the network storage volume 130. For example, users working on a project could be assigned to a data set management group associated with a network storage volume that stores files related to the project. The domain controller 122 is responsible for authenticating users and enforcing security policies for a domain of the on-premises network 120, including the assignment of users to data set management groups.

Users assigned to the data set management group associated with the network storage volume 130 can access and modify the data set stored therein via applications 112-1 to 112-N (referred to herein collectively as applications 112 and individually as an application 112) running on the computing devices 110-1 to 110-N, respectively. In some embodiments, any suitable applications 112 can be used to access and modify the data set stored in the network storage volume 130. For example, when the network storage volume 130 stores media content files, the applications 112 could be media content editing applications.

A file synchronization server 142 running on the file synchronization server device 140 reads the data set stored in the network storage volume 130 and detects modifications to the data set. A file synchronization agent 144 running on the file synchronization server device 140 connects to other file synchronization agents, such as file synchronization agent 188 running on the computing device 180, and synchronizes the data set stored in the network storage volume 130 with copies of the data set stored in other volumes, such as a volume 192 on the storage device 190. In some embodiments, the file synchronization agents transmit synchronization data to each other in a secure manner, such as using AES-128 encryption. Although described herein primarily with respect to a data set stored in one network storage volume 130 and synchronized with a data set stored in one other volume 192, any number of network storage volumes can be used to store data sets in some embodiments, and each data set can be synchronized with copies of the data set stored in any number of other volumes.

In some embodiments, the volume 192 is encrypted to secure the data set stored therein. Any technically feasible encryption technique can be applied to encrypt the volume 192 in some embodiments. The KMS server 150 stores, in a table 152, an encryption key used to encrypt each encrypted volume and a user, a data set permission group, and a storage device associated with the encrypted volume. Accordingly, each encrypted volume is bound to a particular user, data set permission group, and storage device, and only the particular user can access the encrypted volume.

After the storage device 190 is attached to the computing device 180, a VPN client 184 running on the computing device 180 authenticates the user to a VPN provided via the VPN gateway 160. The VPN gateway 160 serves as a VPN endpoint and permits a VPN connection to be established with the on-premises network 120. In some embodiments, the VPN gateway 160 can be implemented using a firewall, server, or router having internetworking and data transmission capabilities. In some embodiments, Internet access by the computing device 180 while connected to the VPN is regulated by a centrally managed web filter.

After the user is authenticated to the VPN and the VPN connection with the on-premises network 120 is established, the VPN client 184 launches a KMS client 186 running on the computing device 180 that also authenticates the user as a second verification. After authenticating the user, the KMS client 186 requests, from the KMS server 150 via the VPN, an encryption key for decrypting the volume 192 based on the user, an identifier (ID) of the volume 192 ("volume ID"), and an ID of the storage device 190 ("storage device ID"). Notably, the KMS server 150 sits behind the VPN and can only be accessed after the user has been authenticated to the VPN and further authenticated to the KMS client 186. In response to the request from the KMS client 186, the KMS server 150 securely returns the encryption key upon verifying that (1) the volume ID is in the table 152 maintained by the KMS server 150, (2) the table 152 indicates the user is associated with the volume ID, and (3) the table 152 further indicates the volume 192 having the volume ID is stored on the storage device 190 having the storage device ID. Using the encryption key returned by the KMS server 150, the KMS client 186 mounts and decrypts the volume 192. Notably, the storage and use of the encryption key is transparent to the user, who is not required to know the encryption key or an associated password in order to decrypt the volume 192.

After the volume 192 is mounted and decrypted, the user can access and modify the data set stored therein via an application 182 running on the computing device 180. Similar to the applications 112, the application 182 can be any suitable application for accessing and modifying the data set stored in the volume 192. Returning to the example in which the data set includes media content files, the application 182 could be a media content editing application. In addition, modifications to the data set stored in the volume 192 can be synchronized, via the file synchronization agent 188, with the data set stored in the network storage volume 130 and other copies of the data set.

In some embodiments, the KMS client 186 unmounts the volume 192 when the VPN connection is terminated. Unmounting the volume 192 returns the volume 192 to an encrypted state. In some embodiments, the KMS client 186 periodically requests, from the KMS server 150, the status of the user and whether the user is assigned to the data set permission group associated with the volume 192. In such cases, the KMS client 186 unmounts the volume 192 when the KMS server 150 returns that (1) the user is no longer valid, or (2) the user is no longer assigned to the data set permission group associated with the volume 192. By not unmounting the volume 192 whenever the VPN connection is terminated, the KMS client 186 can avoid unmounting the volume 192 during disruptions to the VPN connection.

Figure 2:
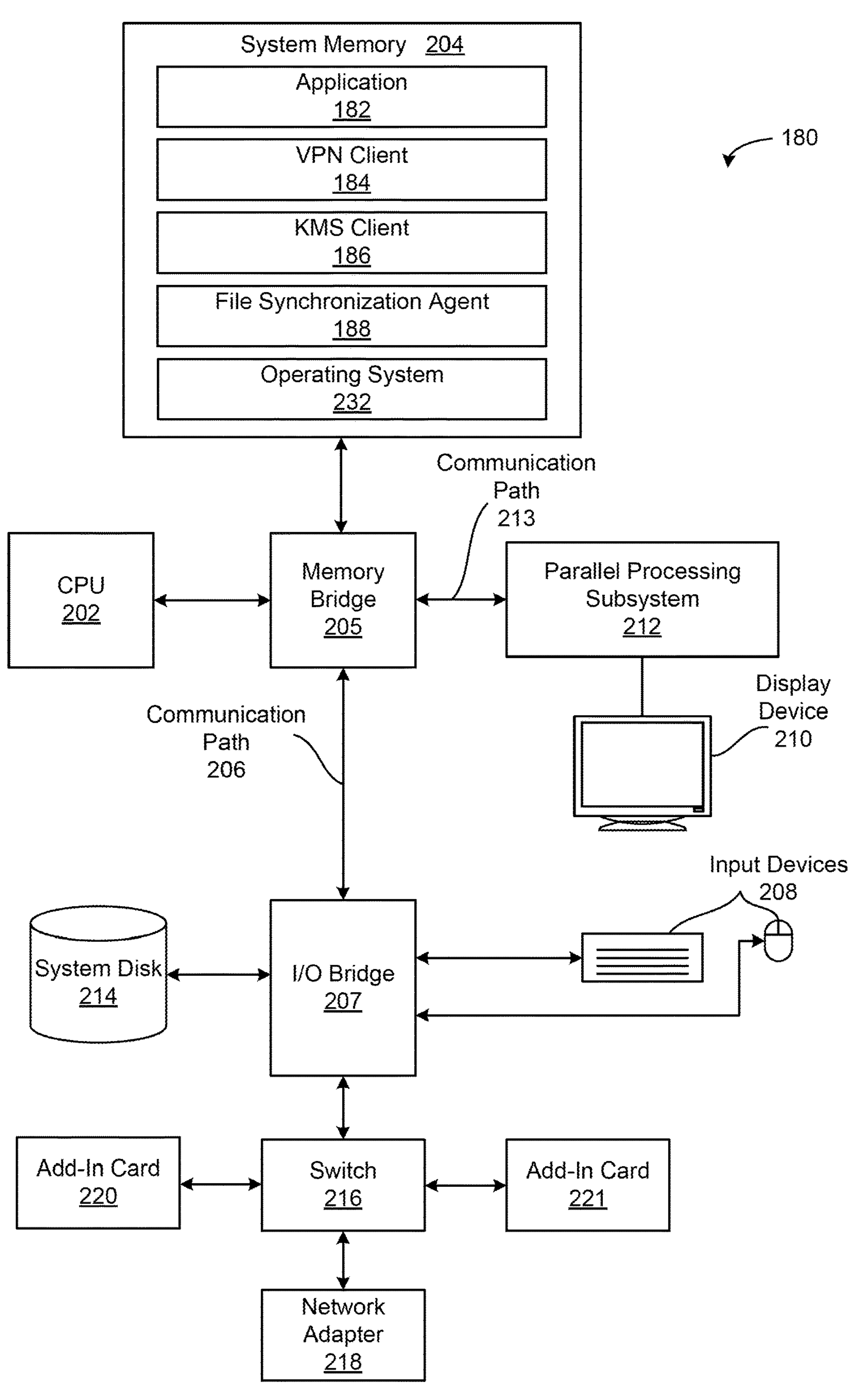
FIG. 2 is a more detailed illustration of the computing device of FIG. 1, according to various embodiments.

FIG. 2 is a more detailed illustration of the computing device 180 of FIG. 1, according to various embodiments. In some embodiments, the computing device 110, the domain controller 122, the file synchronization server device 140, and the key management system server 150 can include similar components as the computing device 180. As shown, the computing device 180 includes, without limitation, a central processing unit (CPU) 202 and a system memory 204 coupled to a parallel processing subsystem 212 via a memory bridge 205 and a communication path 213. The memory bridge 205 is further coupled to an I/O (input/output) bridge 207 via a communication path 206, and the I/O bridge 207 is, in turn, coupled to a switch 216.

In operation, the I/O bridge 207 is configured to receive user input information from one or more input devices 208, such as a keyboard, a mouse, a joystick, etc., and forward the input information to the CPU 202 for processing via the communication path 206 and the memory bridge 205. The switch 216 is configured to provide connections between the I/O bridge 207 and other components of the computing device 180, such as a network adapter 218 and various add-in cards 220 and 221. Although two add-in cards 220 and 221 are illustrated, in some embodiments, the computing device 180 may only include a single add-in card.

As also shown, the I/O bridge 207 is coupled to a system disk 214 that may be configured to store content, applications, and data for use by CPU 202 and parallel processing subsystem 212. As a general matter, the system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, movie recording devices, and the like, may be connected to the I/O bridge 207 as well.

In various embodiments, the memory bridge 205 may be a Northbridge chip, and the I/O bridge 207 may be a Southbridge chip. In addition, communication paths 206 and 213, as well as other communication paths within the computing device 180, may be implemented using any technically suitable protocols, including, without limitation, AGP (Accelerated Graphics Port), HyperTransport, or any other bus or point-to-point communication protocol known in the art.

In some embodiments, the parallel processing subsystem 212 comprises a graphics subsystem that delivers pixels to a display device 210 that may be any conventional cathode ray tube, liquid crystal display, light-emitting diode display, or the like. In such embodiments, the parallel processing subsystem 212 incorporates circuitry optimized for graphics and video processing, including, for example, video output circuitry. Such circuitry may be incorporated across one or more parallel processing units (PPUs) included within the parallel processing subsystem 212. In other embodiments, the parallel processing subsystem 212 incorporates circuitry optimized for general purpose and/or compute processing. Again, such circuitry may be incorporated across one or more PPUs included within the parallel processing subsystem 212 that are configured to perform such general purpose and/or compute operations. In yet other embodiments, the one or more PPUs included within the parallel processing subsystem 212 may be configured to perform graphics processing, general purpose processing, and compute processing operations. The system memory 204 may include at least one device driver configured to manage the processing operations of the one or more PPUs within the parallel processing subsystem 212.

In various embodiments, the parallel processing subsystem 212 may be or include a graphics processing unit (GPU). In some embodiments, the parallel processing subsystem 212 may be integrated with one or more of the other elements of FIG. 2 to form a single system. For example, the parallel processing subsystem 212 may be integrated with the CPU 202 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, the system memory 204 could be connected to the CPU 202 directly rather than through the memory bridge 205, and other devices would communicate with the system memory 204 via the memory bridge 205 and the CPU 202. In other alternative topologies, the parallel processing subsystem 212 may be connected to the I/O bridge 207 or directly to the CPU 202, rather than to the memory bridge 205. In still other embodiments, the I/O bridge 207 and the memory bridge 205 may be integrated into a single chip instead of existing as one or more discrete devices. In some embodiments, any combination of the CPU 202, the parallel processing subsystem 212, and the system memory 204 may be replaced with any type of virtual computing system, distributed computing system, or cloud computing environment, such as a public cloud, a private cloud, or a hybrid cloud. Lastly, in certain embodiments, one or more components shown in FIG. 2 may not be present. For example, the switch 216 could be eliminated, and the network adapter 218 and add-in cards 220, 221 would connect directly to the I/O bridge 207.

Illustratively, the system memory 204 stores an operating system 232 on which the application 182, the VPN client 184, the KMS client 186, and the file synchronization agent 188 run. The operating system 232 may be, e.g., Linux®, Microsoft Windows®, or macOS® in some embodiments. The application 182, the VPN client 184, the KMS client 186, and the file synchronization agent 188 are described in greater detail in conjunction with FIGS. 1 and 3-6.

Centrally Managed Remote Storage Encryption and Decryption

Figure 3:
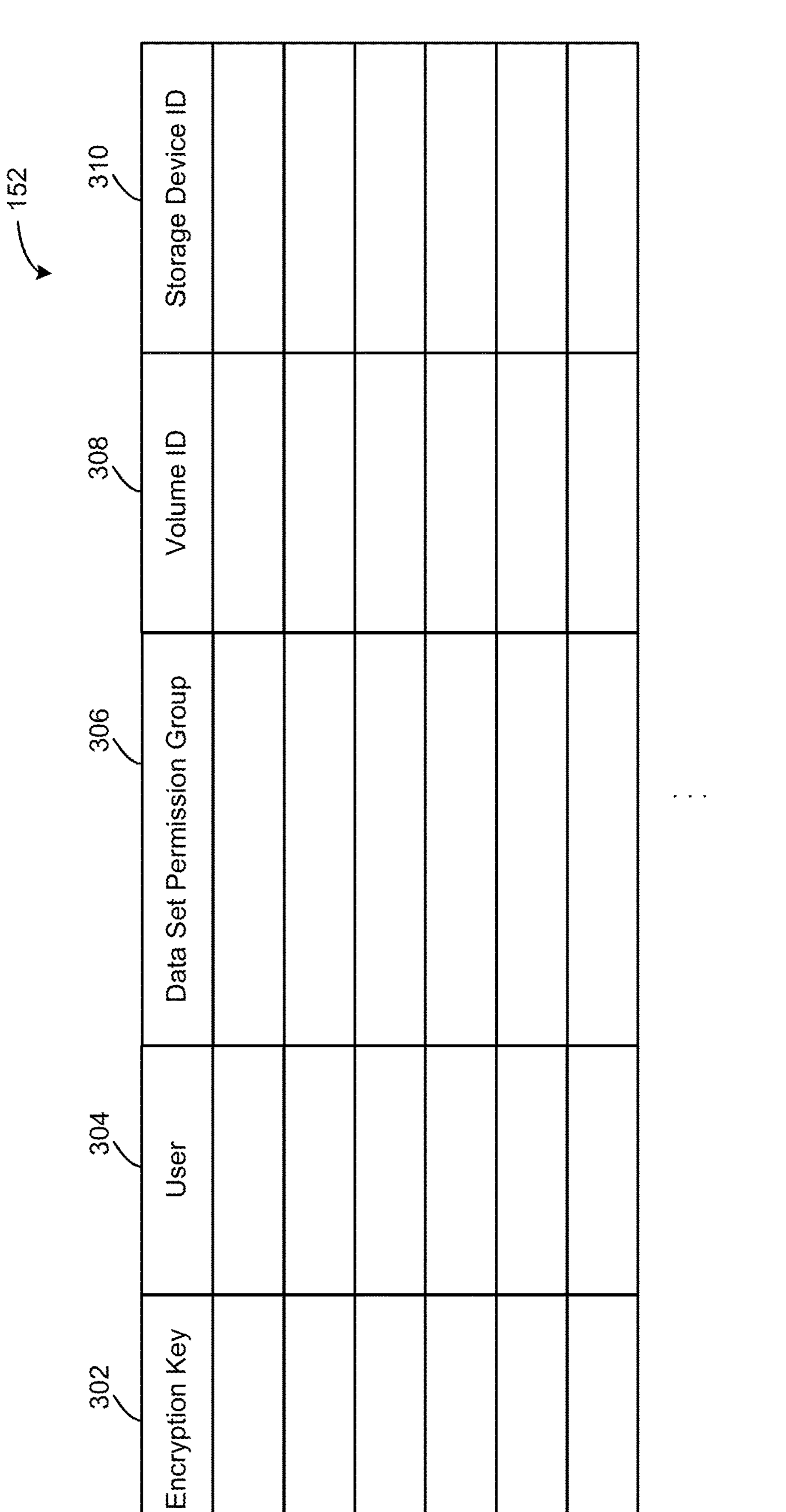
FIG. 3 is a more detailed illustration of the key management system server table of FIG. 1, according to various embodiments.

FIG. 3 is a more detailed illustration of the key management system (KMS) server table 152 of FIG. 1, according to various embodiments. As shown, the table 152 includes encryption key 302, user 304, data set permission group 306, volume identifier (ID) 308, and storage device ID 310 columns. Although described herein primarily with respect to a table, information in the table 152 can be stored in any technically feasible data structure in some embodiments.

In some embodiments, a user can be assigned to zero or more data set permission groups. Each data set permission group is associated with a data set (e.g., a set of files) encased in a logical volume, and only users assigned to the data set permission group are permitted to access and modify the data set. The logical volume can be stored centrally (e.g., as network storage volume 130) and replicated as one or more volumes on storage devices (e.g., a volume 192 on storage device 190).

To secure a volume on a storage device, the KMS client 154 causes the volume to be encrypted using an encryption key. In some embodiments, the KMS client 154 interfaces with an encryption-based file system, such as the Apple File System (APFS), to encrypt a volume on a storage device. In addition, the KMS client 154 registers the encryption key, the user (e.g., a username or identifier (ID) of the user), the data set permission group that the user is assigned to, an ID of the volume, and an ID of the storage device with the KMS server 150, which stores such information in the encryption key 302, user 304, data set permission group 306, volume ID 308, and storage device ID 310 columns of the table 152, respectively. Doing so binds the volume to the user, the data set permission group, and the storage device. In some embodiments, the encryption keys stored in the table 152 are individually salted so that, even if an unauthorized entity captured the table 152, the unauthorized entity would not be able to extract the encryption keys from the table 152. In some embodiments, KMS clients (e.g., KMS client 154 and KMS client 186) are also encrypted applications. Encrypting the KMS clients prevents unauthorized entities from reverse engineering the KMS clients and extracting encryption keys from the KMS clients.

After attaching the storage device (e.g., storage device 190) to a computing device (e.g., computing device 180), a user can access the encrypted volume (e.g., encrypted volume 192) on that storage device via a KMS client (e.g., KMS client 186). In some embodiments, to access the encrypted volume, a VPN client (e.g., VPN client 184) running on the computing device first authenticates the user to a VPN. After authenticating the user to the VPN and establishing a VPN connection to an on-premises network (e.g., on-premises network 120), the VPN client launches the KMS client on the computing device. The KMS client also authenticates the user as a second verification. After authenticating the user, the KMS client requests, from the KMS server 150, an encryption key for decrypting the encrypted volume. The request to the KMS server 150 indicates the user (e.g., a username or ID of the user), a volume ID of the local volume, and a storage device ID of the storage device. The KMS server 150 determines whether the request matches a row in the table 152, indicating that (1) the user is permitted to access the volume having the volume ID, and (2) the volume is stored on the storage device having the storage device ID. When the KMS server 150 identifies a matching row in the table 152, the KMS server 150 transmits the encryption key stored in the matching row to the KMS client. Thereafter, the KMS client mounts and decrypts the mounted volume using the encryption key. In some embodiments, the KMS client interfaces with an encryption-based file system, such as the APFS, to mount and decrypt the volume using the encryption key.

After the volume is mounted and decrypted, the data set stored therein can be accessed and modified by the user. Modifications to the data set are synchronized (e.g., via file synchronization agent 188) with other copies of the data set, such as the data set stored in the network storage volume 130. In addition, the KMS client can unmount the volume when the VPN connection is terminated, or when the KMS server 150 indicates that either (1) the user is no longer valid, or (2) the user is no longer assigned to the data set permission group associated with the volume, as described in greater detail in conjunction with FIGS. 3 and 6. Unmounting the volume returns the volume to an encrypted state.

Figure 4:
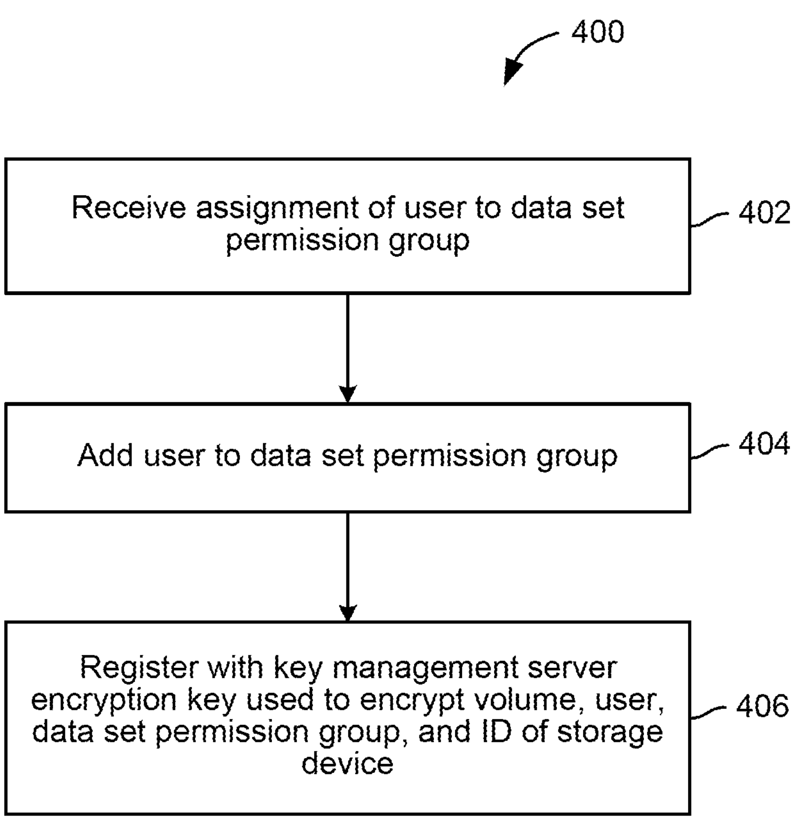
FIG. 4 sets forth a flow diagram of method steps for assigning a user to a data set permission group and a storage device, according to various embodiments.

FIG. 4 sets forth a flow diagram of method steps for assigning a user to a data set permission group and a storage device, according to various embodiments. Although the method steps are described in conjunction with the system of FIG. 1, persons of ordinary skill in the art will understand that any system configured to perform the method steps, in any order, is within the scope of the present disclosure.

As shown, a method 400 begins at step 402, where the KMS client 154 receives an assignment of a user to a data set permission group. In some embodiments, the KMS client 154 provides a graphical user interface (GUI) that permits an administrator (e.g., an administrator on the premises of a firm) to assign a user to a data set permission group. In addition, the GUI can permit the administrator (1) to assign the user to a storage device, (2) to associate a volume on the storage device with the data set permission group, and (3) to encrypt the volume. As described, in some embodiments, the KMS client 154 can interface with an encryption-based file system, such as the APFS, to encrypt the volume on a storage device.

At step 404, the KMS client 154 adds the user to the data set permission group in the domain controller 122. As described, the domain controller 122 is responsible for authenticating users and enforcing security policies for a domain, including the assignment of users to data set permission groups.

At step 406, the KMS client 154 registers, with the KMS server 150, an encryption key used to encrypt the volume associated with the data set permission group, the user, the data set permission group, a volume ID of the volume, and a storage device ID of the storage device that stores the volume. Thereafter, a KMS client (e.g., KMS client 186) can request and use the encryption key to decrypt the volume, as discussed in greater detail in conjunction with FIGS. 3 and 5.

Figure 5:
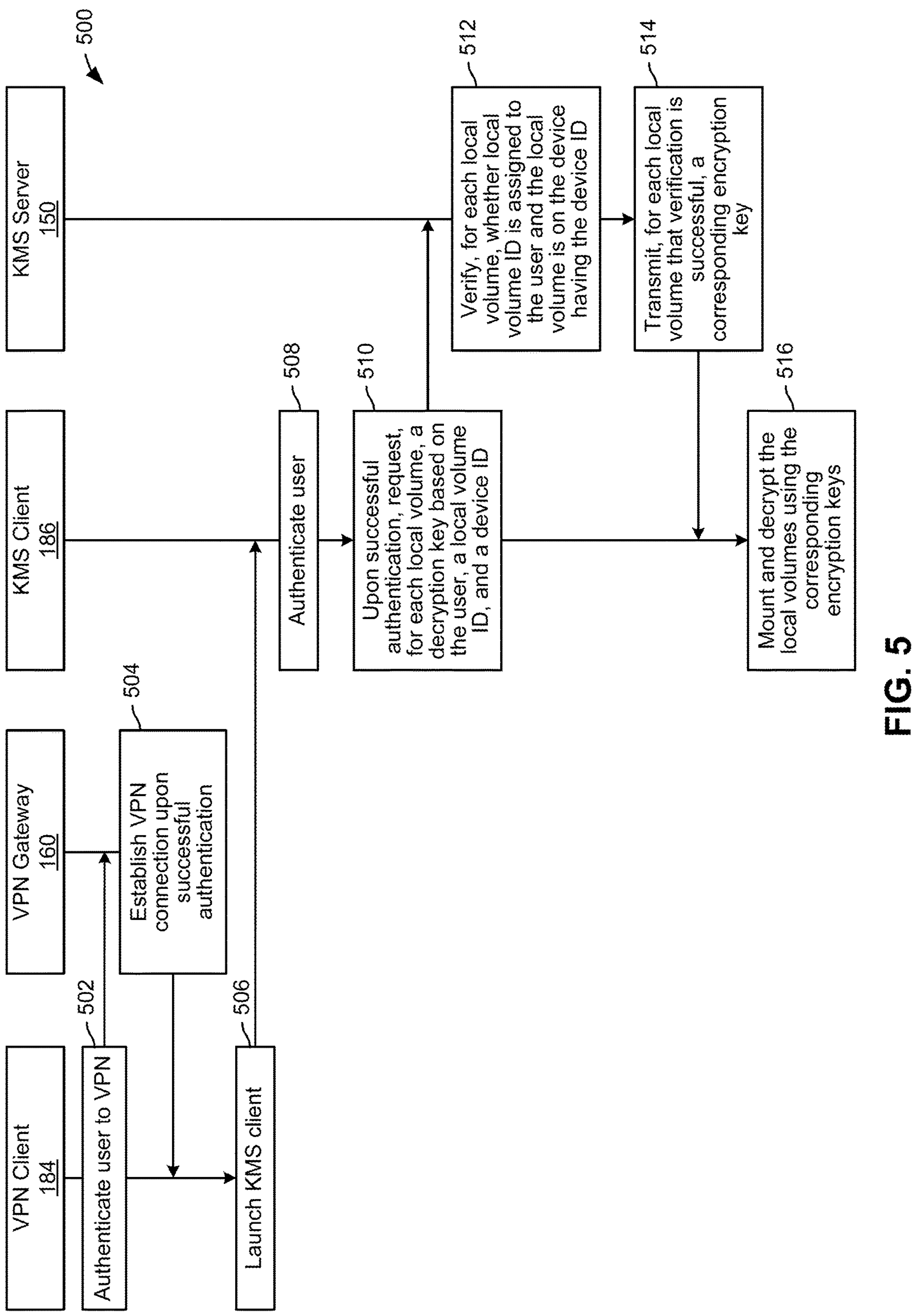
FIG. 5 sets forth a flow diagram of method steps for mounting and decrypting an encrypted volume, according to various embodiments.

FIG. 5 sets forth a flow diagram of method steps for mounting and decrypting an encrypted volume, according to various embodiments. Although the method steps are described in conjunction with the system of FIGS. 1-2, persons of ordinary skill in the art will understand that any system configured to perform the method steps, in any order, is within the scope of the present disclosure.

As shown, a method 500 begins at step 502, where the VPN client 184 authenticates a user to a VPN. In some embodiments, the user can be authenticated to the VPN in any technically feasible manner. For example, in some embodiments, the user can be authenticated to the VPN using two-factor authentication. As another example, in some embodiments, the user can be authenticated to the VPN using a certificate that the VPN client 184 transmits to the VPN gateway 160. In some embodiments, the domain controller 122 approves credentials of the user when the user is authenticated to the VPN.

At step 504, the VPN gateway 160 establishes a VPN connection upon successful authentication of the user. In some embodiments, establishing the VPN connection includes creating a VPN tunnel that provides an encrypted link between the client device (e.g., computing device 180) and an on-premises network (e.g., on-premises network 120).

At step 506, the VPN client 184 launches the KMS client 186. Then, at step 508, the KMS client 186 authenticates the user. In some embodiment, the domain controller 122 approves credentials of the user when authenticating the user to the KMS client 186. Although described herein primarily with respect to authenticating a user to a VPN and authenticating the user to the KMS client 186 as a second verification, in some embodiments, functionality of the VPN client 184 and the KMS client 186 can be implemented in a single application. In such cases, the user can be authenticated once to the application. For example, the application could maintain a continuous VPN connection and require the user to input authentication credentials via a captive portal in order to mount and access encrypted volumes.

At step 510, upon successful authentication of the user, the KMS client 186 requests, for each local volume (e.g., volume 192) that the KMS 186 identifies as being attached to the client device (e.g., computing device 180), an encryption key based on the user, a volume ID of the volume, and a storage device ID of the storage device on which the volume is stored. In some embodiments, the KMS client 186 transmits, to the KMS server 150, a request that indicates a username or ID of the user, the volume ID (or volume IDs if there are multiple local volumes), and the storage device ID (or storage device IDs if there are multiple storage devices).

At step 512, the KMS server 150 verifies, for each local volume, whether (1) the volume ID of the volume is assigned to the user, and (2) the volume is stored on the storage device having the storage device ID. In some embodiments, the KMS server 150 performs the verification by matching the user, volume ID, and storage device ID, to a row in the table 152 that the KMS server 150 maintains.

At step 514, the KMS server 150 transmits, for each local volume that the verification at step 512 is successful, a corresponding encryption key. In some embodiments, the KMS server 150 retrieves the encryption key from a row in the table 152 that associates the encryption key with the user, a data set permission group, the volume ID, and the storage device ID. The KMS server 150 securely transmits such an encryption key to the KMS client 186 via the VPN tunnel.

At step 516, the KMS client 186 mounts and decrypts the local volumes using the corresponding encryption keys. The local volumes can be mounted and decrypted in any technically feasible manner using the corresponding encryption keys, such as by interfacing with an encryption-based file system (e.g., APFS).

Figure 6:
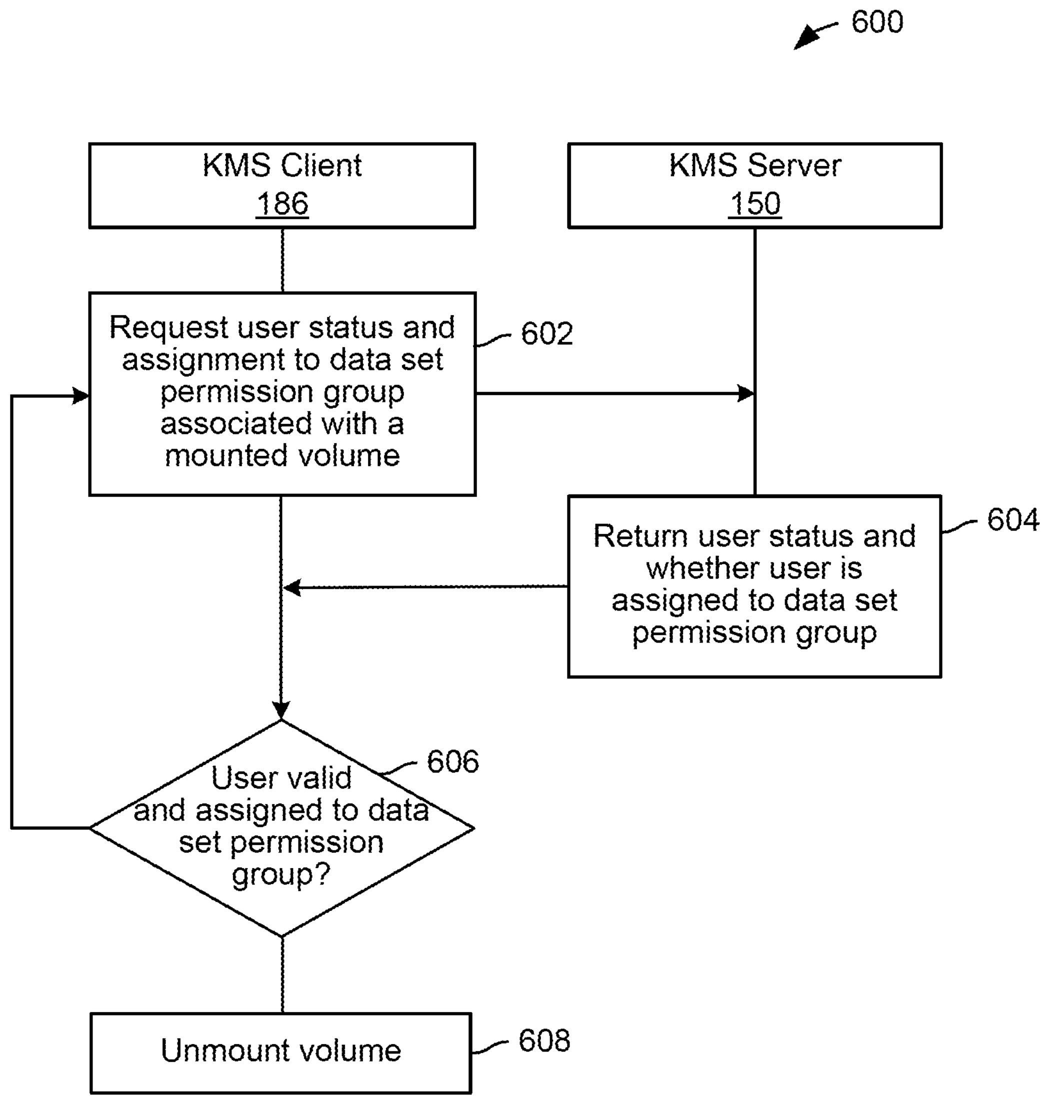
FIG. 6 sets forth a flow diagram of method steps for unmounting a mounted and decrypted volume, according to various embodiments.

FIG. 6 sets forth a flow diagram of method steps for unmounting a mounted and decrypted volume, according to various embodiments. Although the method steps are described in conjunction with the system of FIGS. 1-2, persons of ordinary skill in the art will understand that any system configured to perform the method steps, in any order, is within the scope of the present disclosure.

As shown, a method 600 begins at step 602, where the KMS client 186 requests the status of the user of a client device and whether the user is assigned to a data set permission group associated with a mounted volume. Such a request is made to determine whether the user remains valid and is permitted to access the mounted volume. In some embodiments, a KMS client (e.g., KMS client 154) provides a GUI that allows an administrator to (1) disable, remove, or otherwise invalidate a user; and/or (2) remove an assignment of a user to a data set permission group. In such cases, when a user is invalidated, the KMS client causes the domain controller 122 to remove the user and the association of the user with any data set permission groups. When the assignment of a user to a data set permission group is removed, the KMS client causes the KMS server 150 to delete a row in the table 152 that associates the user with the data set permission group, an encryption key used to encrypt a volume associated with the data set permission group, a volume ID of the volume, and a storage device ID of a storage device.

At step 604, the KMS server 150 returns a status of the user and whether the user is assigned to the data set permission group associated with the mounted volume. In some embodiments, the KMS server 150 determines the status of the user and whether the user is assigned to the data set permission group using the table 152 that stores such information.

At step 606, if the user is valid and still assigned to the data set permission group, then the method 600 returns to step 602 where the KMS client 186 again requests the user status and assignment to the data set permission group associated with the volume. In some embodiments, the KMS client 186 makes periodic requests for the user status and assignment to the data set permission group associated with the volume.

On the other hand, if the user is no longer valid, or if the user is no longer assigned to the data set permission group, then at step 608, the KMS client 186 unmounts the mounted volume. Unmounting the volume returns the volume to an encrypted state.

Although the method 600 is described with respect to the KMS server 150 returning the status of the user and whether the user is assigned to the data set permission group associated with the mounted volume, in some embodiments, the KMS client 186 also unmounts the mounted volume if the KMS server 150 cannot be reached, or if the KMS server 150 cannot be authenticated by the KMS client 186.

In sum, techniques are disclosed for centrally managing remote storage encryption and decryption. In some embodiments, to access an encrypted volume on a storage device that is connected to a computing device, a VPN client authenticates a user of the computing device to a VPN. After the user is authenticated and a VPN connection is established between the computing device and an on-premises network, the VPN client launches a KMS client that authenticates the user and, upon authentication of the user, requests an encryption key associated with the encrypted volume from a KMS server based on the user, a volume ID of the encrypted volume, and a storage device ID of the storage device on which the encrypted volume is stored. The KMS server verifies that the user is allowed to access the encrypted volume having the volume ID, and that the encrypted volume is stored on the storage device having the storage device ID. Upon verification, the KMS server securely transmits the encryption key associated with the encrypted volume to the KMS client. Thereafter, the KMS client mounts and decrypts the encrypted volume using the encryption key.

At least one technical advantage of the disclosed techniques relative to the prior art is that, with the disclosed techniques, the storage and use of encryption keys is transparent to users, who are not required to know the encryption keys or associated passwords in order to decrypt encrypted volumes. Further, access to the decrypted volumes is automatically revoked when users are invalidated or no longer assigned to data set management groups associated with the decrypted volumes. In addition, encrypted volumes are mounted and decrypted only after associated users are authenticated to a secure network environment. These technical advantages represent one or more technological improvements over prior art approaches.

Any and all combinations of any of the claim elements recited in any of the claims and/or any elements described in this application, in any fashion, fall within the contemplated scope of the present invention and protection.

1. In some embodiments, a computer-implemented method for decrypting an encrypted volume comprises identifying an encrypted volume stored on a storage device, requesting, from a server, an encryption key based on a user, an identifier (ID) associated with the encrypted volume, and an ID associated with the storage device, and decrypting the encrypted volume based on the encryption key.
2. The computer-implemented method of clause 1, further comprising authenticating the user to at least one of a virtual private network (VPN) or a client application that requests the encryption key from the server.
3. The computer-implemented method of clauses 1 or 2, wherein the server stores one or more associations between each of one or more encryption keys and a corresponding user, data set management group, ID of an encrypted volume, and ID of a storage device.
4. The computer-implemented method of any of clauses 1-3, wherein the encrypted volume stores a data set, and the user is assigned to a data set management group associated with the encrypted volume.
5. The computer-implemented method of any of clauses 1-4, further comprising mounting the encrypted volume to create a mounted volume, wherein the mounted volume is decrypted.
6. The computer-implemented method of any of clauses 1-5, further comprising, in response to one or more modifications to a data set stored on the mounted volume, synchronizing the data set with one or more data sets stored on one or more other volumes.

7. The computer-implemented method of any of clauses 1-6, further comprising unmounting the mounted volume in response to determining that at least one of the user is invalid or the user is not assigned to a data set management group associated with the mounted volume.

8. The computer-implemented method of any of clauses 1-7, further comprising unmounting the mounted volume subsequent to termination of a virtual private network (VPN) connection.

9. The computer-implemented method of any of clauses 1-8, wherein the storage device comprises an external hard drive attached to a computing device.

10. In some embodiments, one or more non-transitory computer-readable storage media include instructions that, when executed by at least one processor, cause the at least one processor to perform steps for decrypting an encrypted volume, the steps comprising identifying an encrypted volume stored on a storage device, requesting, from a server, an encryption key based on a user, an identifier (ID) associated with the encrypted volume, and an ID associated with the storage device, and decrypting the encrypted volume based on the encryption key.

11. The one or more non-transitory computer-readable storage media of clause 10, wherein the instructions, when executed by the at least one processor, further cause the at least one processor to perform the step of authenticating the user to at least one of a virtual private network (VPN) or a client application that requests the encryption key from the server.

12. The one or more non-transitory computer-readable storage media of clauses 10 or 11, wherein the server stores one or more associations between each of one or more encryption keys and a corresponding user, data set management group, ID of an encrypted volume, and ID of a storage device.

13. The one or more non-transitory computer-readable storage media of any of clauses 10-12, wherein the encrypted volume stores a data set, and the user is assigned to a data set management group associated with the encrypted volume.

14. The one or more non-transitory computer-readable storage media of any of clauses 10-13, wherein the instructions, when executed by the at least one processor, further cause the at least one processor to perform the step of mounting the encrypted volume to create a mounted volume, wherein the mounted volume is decrypted.

15. The one or more non-transitory computer-readable storage media of any of clauses 10-14, wherein the instructions, when executed by the at least one processor, further cause the at least one processor to perform the step of, in response to one or more modifications to a data set stored on the mounted volume, synchronizing the data set with one or more data sets stored on one or more other volumes.

16. The one or more non-transitory computer-readable storage media of any of clauses 10-15, wherein the instructions, when executed by the at least one processor, further cause the at least one processor to perform the step of unmounting the mounted volume in response to determining that at least one of the user is invalid or the user is not assigned to a data set management group associated with the mounted volume.

17. The one or more non-transitory computer-readable storage media of any of clauses 10-16, wherein the instructions, when executed by the at least one processor, further cause the at least one processor to perform the step of unmounting the mounted volume subsequent to termination of a virtual private network (VPN) connection.

18. The one or more non-transitory computer-readable storage media of any of clauses 10-17, wherein the storage device comprises an external hard drive attached to a computing device.

19. In some embodiments, a system comprises one or more memories storing instructions, and one or more processors that are coupled to the one or more memories and, when executing the instructions, are configured to identify an encrypted volume stored on a storage device, request, from a server, an encryption key based on a user, an identifier (ID) associated with the encrypted volume, and an ID associated with the storage device, and decrypt the encrypted volume based on the encryption key.

20. The system of clause 19, wherein the one or more processors, when executing the instructions, are further configured to authenticate the user to at least one of a virtual private network (VPN) or a client application that requests the encryption key from the server.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for decrypting an encrypted volume, the method comprising:

identifying an encrypted volume stored on a storage device that is attached to a computing device, wherein the computing device is remote from a premises of an entity;

authenticating a user to a virtual private network that extends an on-premises network at the premises of the entity;

requesting, from a server via the virtual private network, an encryption key based on the user, an identifier (ID) associated with the encrypted volume, and an ID associated with the storage device; and decrypting the encrypted volume based on the encryption key.

2. The computer-implemented method of claim 1, wherein the user is authenticated to the virtual private network via a VPN client running on the computing device, and further comprising further authenticating the user to a client application on the computing device prior to the client application requesting the encryption key from the server.

3. The computer-implemented method of claim 1, wherein the server stores one or more associations between each of one or more encryption keys and a corresponding user, a data set management group, a volume ID of an encrypted volume, and a storage device ID of a storage device.

4. The computer-implemented method of claim 1, wherein the encrypted volume stores a data set, and the user is assigned to a data set management group associated with the encrypted volume.

5. The computer-implemented method of claim 1, further comprising mounting the encrypted volume to create a mounted volume, wherein the mounted volume is decrypted.

6. The computer-implemented method of claim 5, further comprising, in response to one or more modifications to a data set stored on the mounted volume, synchronizing the data set with one or more data sets stored on one or more other volumes located on the premises of the entity.

7. The computer-implemented method of claim 5, further comprising unmounting the mounted volume in response to determining that at least one of the user is invalid or the user is not assigned to a data set management group associated with the mounted volume.

8. The computer-implemented method of claim 5, further comprising unmounting the mounted volume subsequent to termination of a virtual private network (VPN) connection with the on-premises network at the premises of the entity.

9. The computer-implemented method of claim 1, wherein the storage device comprises an external hard drive attached to a computing device.

10. One or more non-transitory computer-readable storage media including instructions that, when executed by at least one processor, cause the at least one processor to perform steps comprising:

identifying an encrypted volume stored on a storage device that is attached to a computing device, wherein the computing device is remote from a premises of an entity;

authenticating a user to a virtual private network that extends an on-premises network at the premises of the entity;

requesting, from a server via the virtual private network, an encryption key based on the user, an identifier (ID) associated with the encrypted volume, and an ID associated with the storage device; and decrypting the encrypted volume based on the encryption key.

11. The one or more non-transitory computer-readable storage media of claim 10, wherein the instructions, when executed by the at least one processor, further cause the at least one processor to perform the step of authenticating the user to a client application on the computing device that requests the encryption key from the server.

12. The one or more non-transitory computer-readable storage media of claim 10, wherein the server stores one or more associations between each of one or more encryption keys and a corresponding user, a data set management group, a volume ID of an encrypted volume, and a storage device ID of a storage device.

13. The one or more non-transitory computer-readable storage media of claim 10, wherein the encrypted volume stores a data set, and the user is assigned to a data set management group associated with the encrypted volume.

14. The one or more non-transitory computer-readable storage media of claim 10, wherein the instructions, when executed by the at least one processor, further cause the at least one processor to perform the step of mounting the encrypted volume to create a mounted volume, wherein the mounted volume is decrypted.

15. The one or more non-transitory computer-readable storage media of claim 14, wherein the instructions, when executed by the at least one processor, further cause the at least one processor to perform the step of, in response to one or more modifications to a data set stored on the mounted volume, synchronizing the data set with one or more data sets stored on one or more other volumes.

16. The one or more non-transitory computer-readable storage media of claim 14, wherein the instructions, when executed by the at least one processor, further cause the at least one processor to perform the step of unmounting the mounted volume in response to determining that at least one of the user is invalid or the user is not assigned to a data set management group associated with the mounted volume.

17. The one or more non-transitory computer-readable storage media of claim 14, wherein the instructions, when executed by the at least one processor, further cause the at least one processor to perform the step of unmounting the mounted volume subsequent to termination of a virtual private network (VPN) connection between the computing device and the on-premises network.

18. The one or more non-transitory computer-readable storage media of claim 10, wherein the storage device comprises an external hard drive attached to the computing device.

19. A system, comprising:

one or more memories storing instructions; and one or more processors that are coupled to the one or more memories and, when executing the instructions, are configured to:

identify an encrypted volume stored on a storage device that is attached to a computing device, wherein the computing device is remote from a premises of an entity, authenticate a user to a virtual private network that extends an on-premises network at the premises of the entity, request, from a server via the virtual private network, an encryption key based on the user, an identifier (ID) associated with the encrypted volume, and an ID associated with the storage device, and decrypt the encrypted volume based on the encryption key.

20. The system of claim 19, wherein the one or more processors, when executing the instructions, are further configured to authenticate the user to a client application on the computing device that requests the encryption key from the server.

* * * * *